United States Patent
Ogawa et al.

[11] Patent Number: 5,847,903
[45] Date of Patent: Dec. 8, 1998

[54] MAGNETIC CIRCUIT STRUCTURE FOR A ROTARY ACTUATOR IN A DISK DRIVE

[75] Inventors: Yoshinori Ogawa; Kazunori Tochiyama; Yoshihiro Sato; Hironori Suzuki, all of Kawasaki, Japan

[73] Assignee: Fujitsu Limited, Kawasaki, Japan

[21] Appl. No.: 751,414

[22] Filed: Nov. 18, 1996

Related U.S. Application Data

[63] Continuation of Ser. No. 343,031, Nov. 21, 1994.

[30] Foreign Application Priority Data

Feb. 22, 1994 [JP] Japan .................................. 6-024453

[51] Int. Cl.⁶ .............................. H02K 41/00; G11B 5/55; G11B 21/08; G11B 5/52
[52] U.S. Cl. ........................... 360/106; 360/107; 310/13; 310/12
[58] Field of Search ................................ 310/12, 13, 217, 310/156; 360/106, 107, 98.07, 99.08, 99.12, 105

[56] References Cited

U.S. PATENT DOCUMENTS

| | | | |
|---|---|---|---|
| 2,146,519 | 2/1939 | Zimmerman | 360/99.12 |
| 4,661,729 | 4/1987 | Hames et al. | 310/13 |
| 4,720,649 | 1/1988 | Habermann et al. | 310/217 |
| 4,728,842 | 3/1988 | Martin | 310/217 |
| 4,855,850 | 8/1989 | Nagaoka et al. | 360/99.12 |
| 4,872,411 | 10/1989 | Schalk | 360/107 |
| 5,005,095 | 4/1991 | Wagner | 360/106 |
| 5,089,922 | 2/1992 | LeClair | 360/99.08 |
| 5,113,099 | 5/1992 | Wong et al. | 310/13 |
| 5,142,178 | 8/1992 | Kloster et al. | 310/217 |
| 5,168,184 | 12/1992 | Umehara et al. | 360/106 |
| 5,258,678 | 11/1993 | Futami | 310/156 |
| 5,338,996 | 8/1994 | Yamamoto | 310/217 |
| 5,363,004 | 11/1994 | Futami et al. | 310/156 |
| 5,424,591 | 6/1995 | Kuriyama | 310/12 |

FOREIGN PATENT DOCUMENTS

| | | |
|---|---|---|
| 219688 | 4/1987 | European Pat. Off. . |
| 0544537 | 6/1993 | European Pat. Off. . |
| 173572 | 3/1989 | Japan . |
| 3135354 | 6/1991 | Japan . |
| 3235651 | 10/1991 | Japan . |
| 541044 | 2/1993 | Japan . |
| 5109523 | 4/1993 | Japan . |

*Primary Examiner*—John H. Wolff
*Assistant Examiner*—Adriana Giordana
*Attorney, Agent, or Firm*—Greer, Burns & Crain, Ltd.

[57] ABSTRACT

A magnetic circuit structure in a disk unit which can be manufactured at low costs. The magnetic circuit includes a main yoke manufactured by stacking a plurality of rolled steel plates and connecting them together by caulking. The magnetic circuit further includes an inner magnet, an outer magnet, and a side yoke all of which are mounted on the main yoke. Both ends of the inner magnet abut against a pair of shoulders formed on the main yoke, and both ends of the outer magnet abut against a pair of shoulders formed on the main yoke. Vertical movement of the inner magnet is prevented by a pair of presser plates and fixed to the main yoke, and vertical movement of the outer magnet is also prevented by a pair of presser plates and fixed to the main yoke.

22 Claims, 11 Drawing Sheets

FIG. 3
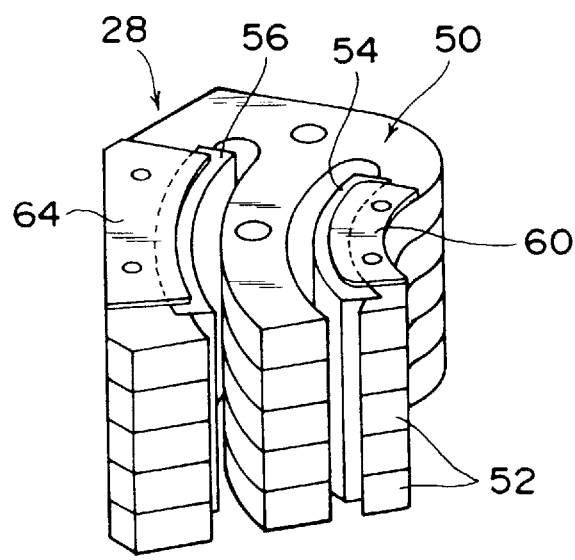
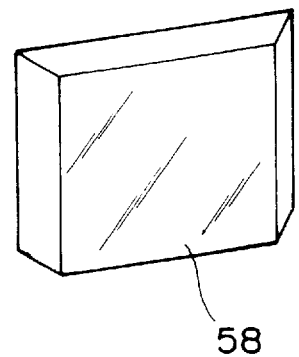

FIG. 7
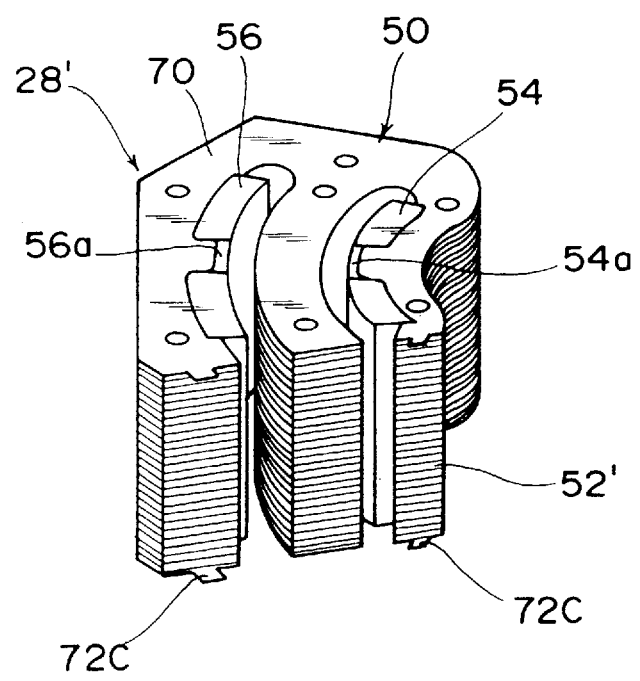
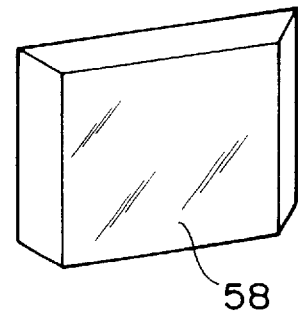

MAGNETIC CIRCUIT STRUCTURE FOR A ROTARY ACTUATOR IN A DISK DRIVE

This application is a continuation of copending application Ser. No. 08/343,031 filed on Nov. 21, 1994.

BACKGROUND OF THE INVENTION

1. Field of the Invention

The present invention relates to a magnetic circuit structure for driving an actuator assembly in a disk unit.

2. Description of the Related Art

In recent years, a magnetic disk unit as a kind of external storage for a computer has been desired which has reduced size and an enlarged capacity. In association with the reduction in size of the magnetic disk unit, demand has increased for the manufacture of a compact, high-performance, low-cost magnetic circuit to be used in a voice coil motor (VCM) for driving an actuator assembly which is mounted in the magnetic disk unit.

In general, such a magnetic circuit is composed of a yoke and a plurality of magnets mounted on the yoke. In a large-sized magnetic disk unit such as a 8-inch disk unit or a 5.5-inch disk unit, the yoke is conventionally manufactured by casting or sintering. Further, the yoke and the magnets are generally connected together by bonding. The bonding work requires much time and increases the cost, and a gas is generated from the adhesive in the bonding work. The gas has an adverse effect on magnetic heads. In particular, the adverse effect of the gas on thin-film magnetic heads for high-density recording is great.

The smaller the size of the magnetic disk unit, the smaller the height of the yoke. In the conventional large-sized magnetic disk unit, a yoke having a relatively large height is necessary, and it is therefore not realistic to manufacture the yoke by stacking a plurality of rolled steel plates adopted in a yoke of a rotary motor. Accordingly, the yoke in the large-sized magnetic disk unit is conventionally manufactured by casting or sintering as mentioned above. However, the yoke manufactured by such a method is relatively expensive because the yoke has a generally complex shape.

Further, the bonding of the yoke and the magnets creates a gas generated from the adhesive that adversely affects the magnetic heads as mentioned above. To cope with this problem, there has recently been proposed a magnetic circuit having a structure in which the magnets are attached by magnetic to the yoke rather than the magnets are bonded to the yoke. However, the magnetic circuit having this structure requires a means for preventing slip between the yoke and the magnets, causing a shape of the yoke and/or the magnets to become more complex increases the cost of the magnetic circuit. As a result, the effect of eliminating the bonding between the yoke and the magnets is not as first anticipated.

SUMMARY OF THE INVENTION

It is therefore an object of the present invention to provide a magnetic circuit structure in a magnetic disk unit which can be manufactured simply at low costs.

It is another object of the present invention to provide a magnetic circuit structure in a magnetic disk unit which can prevent slip between the yoke and the magnets with a simple structure eliminating the bonding between the yoke and the magnets.

According to a first aspect of the present invention, there is provided a magnetic circuit structure in a disk unit, comprising a main yoke manufactured by stacking a plurality of rolled steel plates, the main yoke having an inner yoke, a center yoke spaced a given distance from the inner yoke, an outer yoke spaced a given distance from the center yoke, and a connecting portion integrally connecting the inner yoke, the center yoke, and the outer yoke; an inner magnet mounted on an outer circumferential surface of the inner yoke opposed to the center yoke; an outer magnet mounted on an inner circumferential surface of the outer yoke opposed to the center yoke; and a side yoke attached to the main yoke on a side opposite to the connecting portion by the magnetic forces of the inner magnet and the outer magnet; the outer circumferential surface of the inner yoke having a pair of shoulders against which both circumferential ends of the inner magnet abut, the inner circumferential surface of the outer yoke having a pair of shoulders against which both circumferential ends of the outer magnet abut.

Preferably, a pair of plates for preventing vertical slip of the inner magnet are fixed to an upper surface and a lower surface of the inner yoke, and a pair of plates for preventing vertical slip of the outer magnet are fixed to an upper surface and a lower surface of the outer yoke.

As a modification, shallow grooves are formed at substantially central portions of upper and lower surfaces of the inner magnet and the outer magnet, and a plurality of projections engaging with the shallow grooves are formed on uppermost and lowermost rolled steel plates of the main yoke. These projections prevent the vertical slip of the inner magnet and the outer magnet.

According to a second aspect of the present invention, there is provided a magnetic circuit structure in a disk unit, comprising a main yoke manufactured by stacking a plurality of rolled steel plates, the main yoke having an inner yoke, an outer yoke spaced a given distance from the inner yoke, and a connecting portion integrally connecting the inner yoke and the outer yoke; an inner magnet mounted on an outer circumferential surface of the inner yoke opposed to the outer yoke; an outer magnet mounted on an inner circumferential surface of the outer yoke opposed to the inner yoke; and a side yoke attached to the main yoke on a side opposite to the connecting portion by magnetic forces of the inner magnet and the outer magnet; the outer circumferential surface of the inner yoke having a pair of shoulders against which both circumferential ends of the inner magnet abut, the inner circumferential surface of the outer yoke having a pair of shoulders against which both circumferential ends of the outer magnet abut.

According to the present invention, the main yoke is manufactured by stacking the plurality of rolled steel plates. Accordingly, the main yoke having a complex shape can be simply formed, thereby reducing a manufacturing cost of the main yoke. In a general magnetic circuit, it is easy to provide a projection or a groove for restraining slip of a magnet in one direction, but it is difficult to simultaneously integrally form a projection or a groove for preventing slip of the magnet in a direction substantially perpendicular to the one direction.

In the magnetic circuit structure of the present invention, circumferential slip of the inner magnet and the outer magnet is prevented by the shoulders formed on the main yoke. Furthermore, vertical slip of the inner magnet and the outer magnet is prevented by the plural plates fixed to the upper surface and the lower surface of the main yoke. Accordingly, the magnets can be fixed to the main yoke with no occurrence of any slip without using adhesive.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 3 is an exploded perspective view of a magnetic circuit according to a first preferred embodiment;

FIG. 7 is an exploded perspective view of a magnetic circuit according to a second preferred embodiment;

DESCRIPTION OF THE PREFERRED EMBODIMENTS

Figure 1:
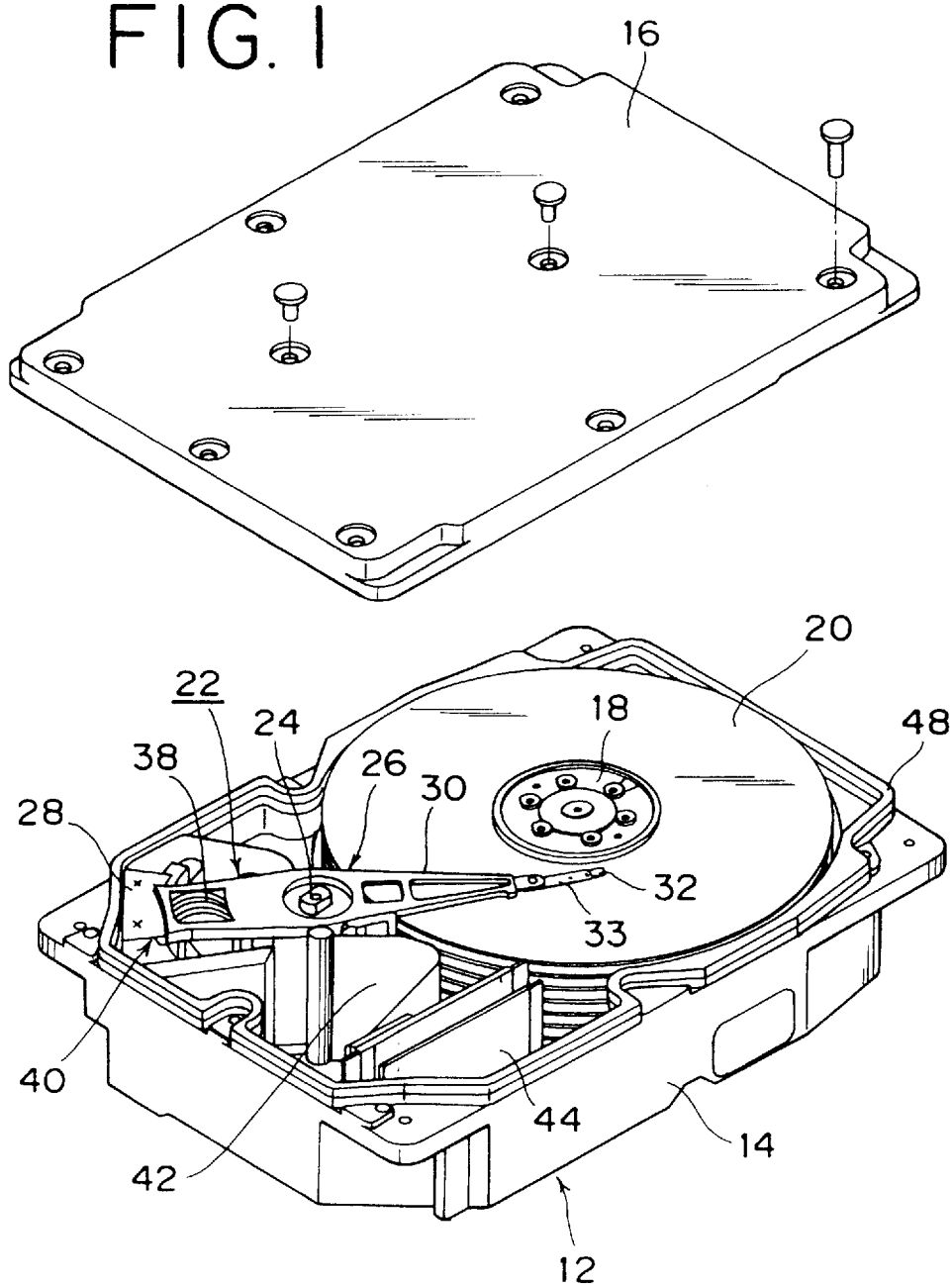
FIG. 1 is a perspective view of a magnetic disk unit in which a magnetic circuit according to the present invention is mounted.

Some preferred embodiments of the present invention will now be described in detail with reference to the drawings. Referring to FIG. 1, there is shown a perspective view of a magnetic disk unit mounting a magnetic circuit of the present invention therein. Reference numeral 12 denotes a housing (enclosure) composed of a base 14 and a cover 16. A spindle hub 18 to be rotatably driven by an inner hub motor not shown is provided on the base 14. A plurality of magnetic disks 20 and spacers not shown are alternately stacked and mounted on the spindle hub 18. That is, the plurality of magnetic disks 20 are regularly spaced from each other and are mounted on the spindle hub 18.

Figure 2:
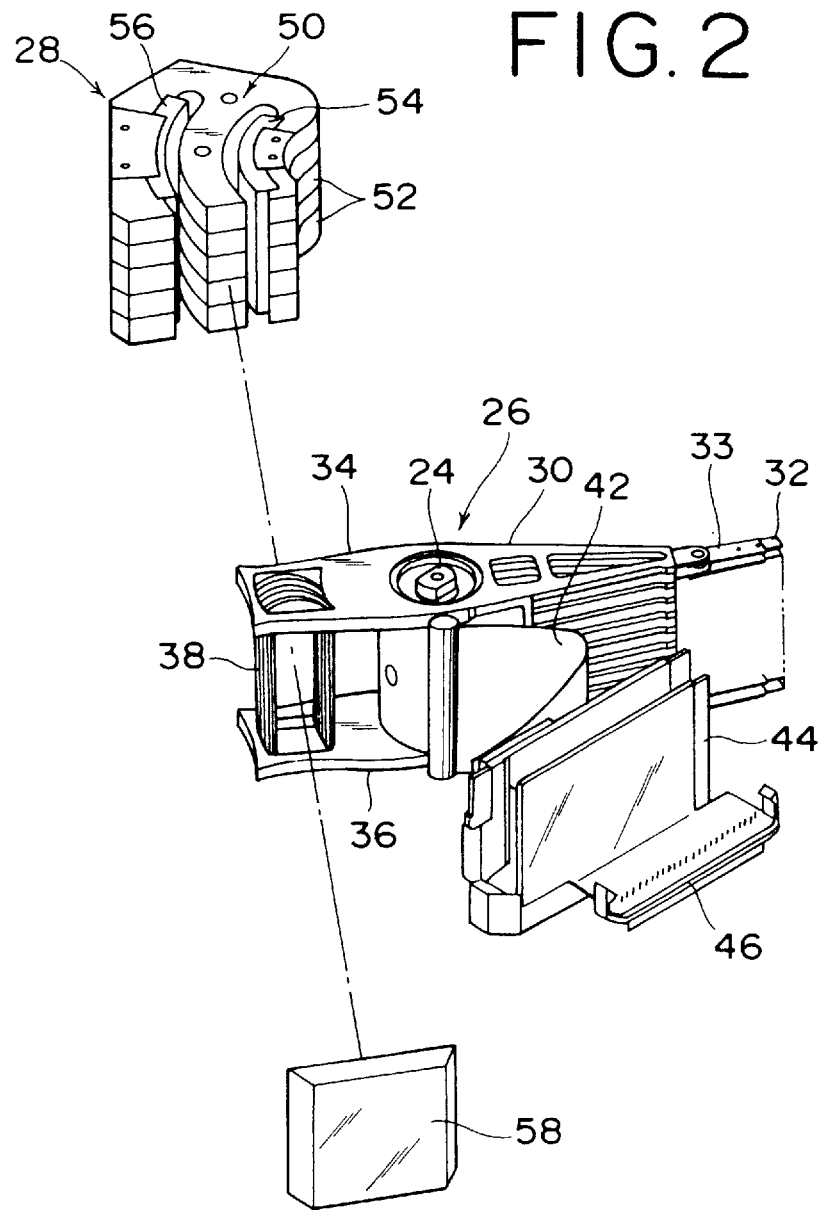
FIG. 2 is an exploded perspective view of an actuator assembly.

Reference numeral 22 denotes a rotary actuator assembly composed of an actuator arm assembly 26 and a magnetic circuit 28. As best shown in FIG. 2, the actuator arm assembly 26 is rotatably mounted on a shaft 24 fixed to the base 14, and includes a plurality of actuator arms 30 extending in one direction from the center of rotation and a pair of coil supporting members 34 and 36 extending in another direction opposite to the direction of extension of the actuator arms 30. A spring arm 33 supporting a magnetic head 32 is fixed to an end portion of each actuator arm 30. A coil 38 is supported by the pair of coil supporting members 34 and 36 and is inserted in two gaps of the magnetic circuit 28. The magnetic circuit 28 and the coil 38 constitute a voice coil motor 40. Reference numeral 42 denotes a flexible printed wiring board for receiving a signal from each magnetic head 32. The flexible printed wiring board 42 is fixed at its one end by a fixing member 44 and is electrically connected to a connector 46.

Referring again to FIG. 1, an annular packing assembly 48 is mounted on the base 14. The cover 16 is fixed to the base 14 by screws with the annular packing assembly 48 interposed therebetween, thus sealing the housing 12. Referring to FIGS. 2 and 3, the magnetic circuit 28 includes a main yoke 50 formed by stacking a plurality of cold rolled steel plates 52 and connecting them together by caulking. An inner magnet 54 and an outer magnet 56 are attached by their magnetic forces to the main yoke 50. Reference numeral 58 denotes a side yoke attached to the main yoke 50 by the magnetic forces of the inner magnet 54 and the outer magnet 56.

The magnetic circuit 28 according to a first preferred embodiment of the present invention will now be described in more detail with reference to FIGS. 4 and 5. A plurality of projections 52a are formed on an upper surface of each rolled steel plate 52, and a plurality of recesses 52b each having a shape corresponding to that of each projection 52a are formed on a lower surface of each rolled steel plate 52. The main yoke 50 is manufactured by stacking the plural rolled steel plates 52 in such a manner as to engage the projections 52a of each lower rolled steel plate 52 with the recesses 52b of each upper rolled steel plate 52, and then connecting the stacked rolled steel plates 52 together by caulking.

Figure 4:
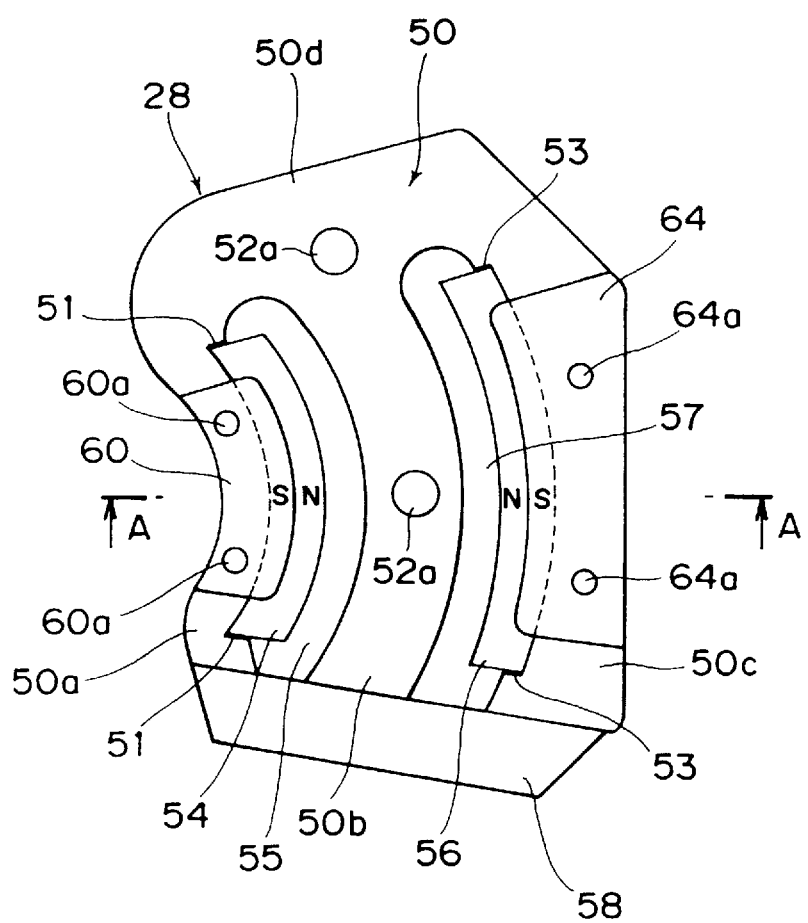
FIG. 4 and in the direction indicated generally is a plan view of the magnetic circuit according to the first preferred embodiment.

As best shown in FIG. 4, the main yoke 50 has an E-shaped configuration so that it is composed of an arcuate inner yoke 50a, an arcuate center yoke 50b, an arcuate outer yoke 50c, and a connecting portion 50d integrally connecting the inner yoke 50a, the center yoke 50b, and the outer yoke 50c. An outer circumferential surface of the inner yoke 50a is formed with a pair of shoulders 51 against which both circumferential ends of the inner magnet 54 abut, thereby preventing the inner magnet 54 from sliding in its circumferential direction. An inner circumferential surface of the outer yoke 50c is formed with a pair of shoulders 53 against which both circumferential ends of the outer magnet 56 abut, thereby preventing the outer magnet 56 from sliding in its circumferential direction.

Figure 5:
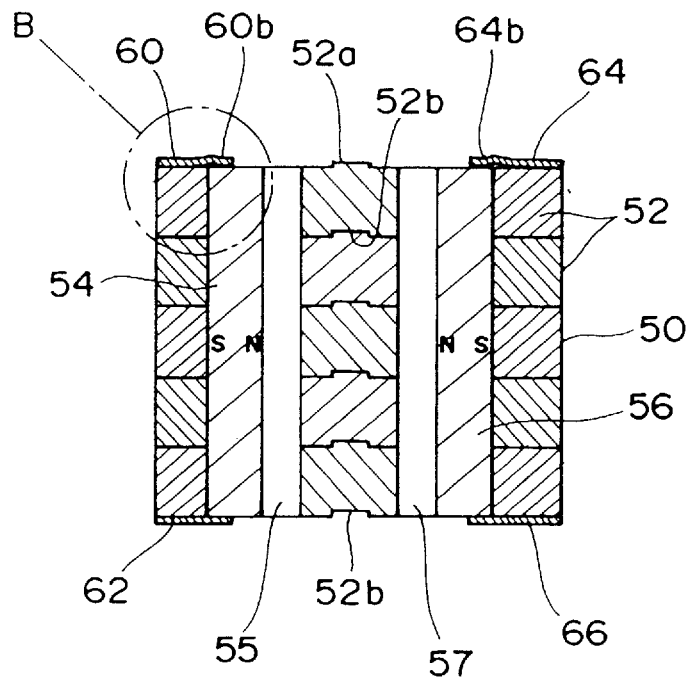
FIG. 5 is a cross section taken along the line A—A in FIG. 4.

As shown in FIG. 5, a pair of plates 60 and 62 for preventing the inner magnet 54 from sliding in its vertical direction are fixed to an upper surface and a lower surface of the inner yoke 50a by caulking. Similarly, a pair of plates 64 and 66 for preventing the outer magnet 56 from sliding in its vertical direction are fixed to an upper surface and a lower surface of the outer yoke 50c by caulking.

In FIG. 4, reference numerals 60a and 64a denote a plurality of caulked portions of the plates 60 and 64. An inner gap 55 is defined between the inner magnet 54 and the center yoke 50b, and an outer gap 57 is defined between the outer magnet 56 and the center yoke 50b. The coil 38 of the actuator arm assembly 26 is inserted in these gaps 55 and 57 to construct the voice coil motor 40. The plates 60 and 64 fixed to the upper surface of the main yoke 50 are formed from a spring steel plate, and the plates 62 and 66 fixed to the lower surface of the main yoke 50 are formed from a cold rolled steel plate.

Figure 6:
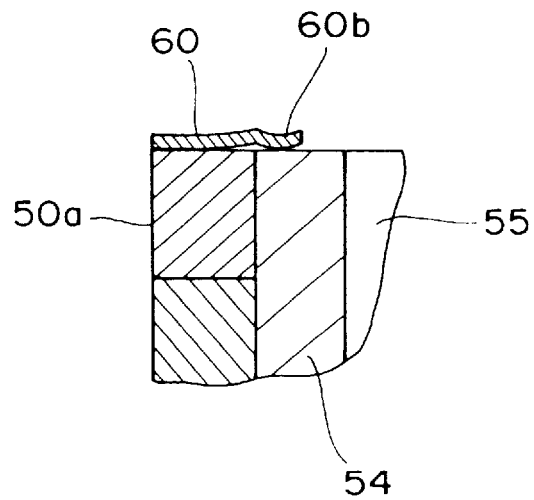
FIG. 6 is an enlarged view of a portion B shown in FIG. 5.

As shown in FIGS. 5 and 6, the plate 60 formed from a spring steel plate has a front bent portion 60b for downwardly pressing the inner magnet 54 to firmly fix it in the vertical direction. Similarly, the plate 64 also has a front bent portion 64b for downwardly pressing the outer magnet 56 to firmly fix it in the vertical direction.

In general, parts that are prone to rust, such as a yoke for a magnetic circuit, require are subjected to anticorrosion treatment. The main yoke 50 according to this preferred embodiment is subjected to anticorrosion treatment described below. First, the main yoke 50 formed by stacking the plural rolled steel plates 52 and connected together by caulking is immersed into a liquid resin, and evacuation is carried out to allow the resin penetrate between the rolled steel plates 52 adjacent to each other. Thereafter, the main yoke 50 is taken out of the liquid resin to cure the resin attached to the rolled steel plates 52. Then, excess resin attached to the surface of the main yoke 50 is removed by sand blasting. Thereafter, the surface of the main yoke 50 is plated with nickel. Such a series of treatment to the main yoke 50 improves the anticorrosion property of the main yoke 50.

Instead of removing the excess resin from the surface of the main yoke 50 by sand blasting, a resin coating may be applied to the entire surface of the main yoke 50. As another anticorrosion treatment, steam treatment may be carried out to form an $Fe_3O_4$ coating having a strong anticorrosion property on the surface of each rolled steel plate 52. As yet another method, a brazing material may be layered between the rolled steel plates 52 adjacent to each other and then melted by heating so that the brazen material become tightly attached to each rolled steel plate 52.

Now, the structure of a magnetic circuit 28' according to a second preferred embodiment of the present invention will be described with reference to FIGS. 7 to 9. In the following description of the second preferred embodiment, substantially the same components as those of the first preferred embodiment are denoted by the same reference numerals, and the explanation thereof will be omitted herein.

A main yoke 50 according to this preferred embodiment is manufactured by stacking a plurality of hot rolled steel plates 52' formed by pressing and then connecting them together by caulking. The main yoke 50 according to this preferred embodiment also has an E-shaped configuration similar to that of the first preferred embodiment. As shown in FIG. 8, a shallow groove 54a is formed at a substantially central portion of an upper surface of an inner magnet 54, and a shallow groove 56a is also formed at a substantially central portion of an upper surface of an outer magnet 56.

An uppermost rolled steel plate 70 forming an uppermost layer of the main yoke 50 has two projections 70a and 70b respectively engaging with the grooves 54a and 56a, so that the inner magnet 54 and the outer magnet 56 are downwardly pressed by the projections 70a and 70b. Similarly, shallow grooves 54a and 56a are also formed at substantially central portions of lower surfaces of the inner magnet 54 and the outer magnet 56, respectively, and a lowermost rolled steel plate 72 forming a lowermost layer of the main yoke 50 has two projections 72a and 72b respectively engaging with the grooves 54a and 56a formed on the lower surfaces of the inner magnet 54 and the outer magnet 56 to upwardly press the inner magnet 54 and the outer magnet 56.

In this manner, the inner magnet 54 and the outer magnet 56 are pressed in the vertically opposite directions by the projections 70a and 70b of the uppermost rolled steel plate 70 and the projections 72a and 72b of the lowermost rolled steel plate 72, thereby preventing vertical slide of the inner magnet 54 and the outer magnet 56.

Figure 8:
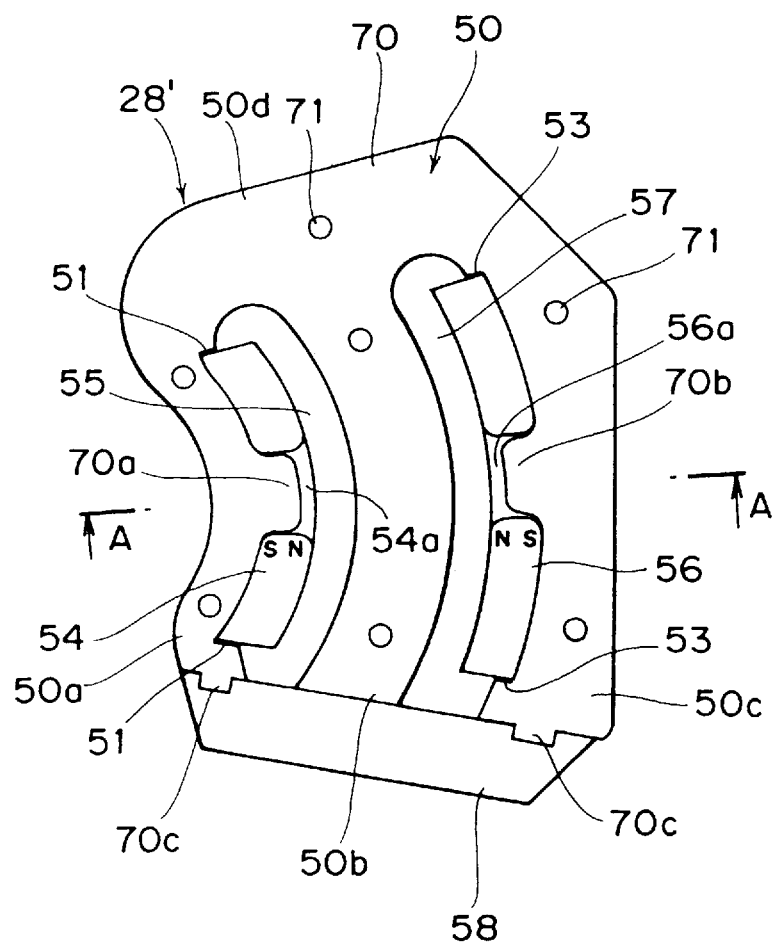
FIG. 8 and in the direction indicated generally is a plan view of the magnetic circuit according to the second preferred embodiment.
Figure 9:
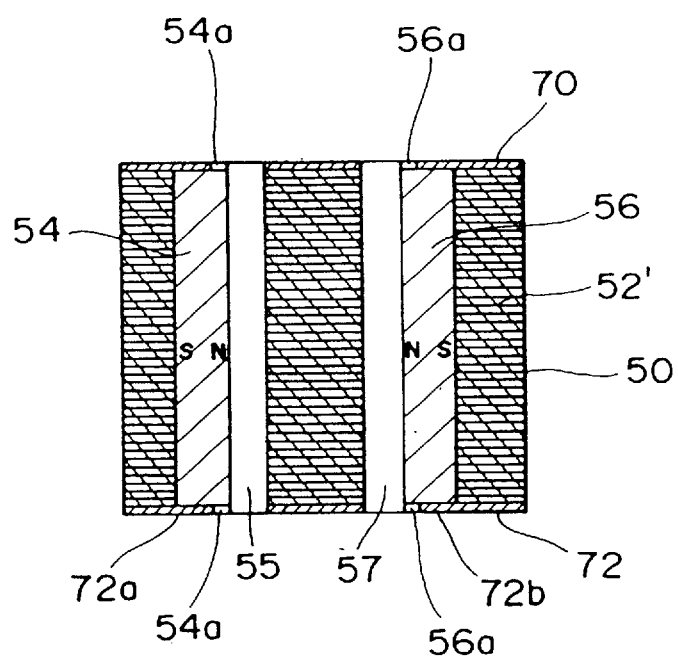
FIG. 9 is a cross section taken along the line A—A in FIG. 8.

In FIG. 8, reference numerals 71 denote a plurality of caulked portions. The uppermost rolled steel plate 70 further has a pair of projections 70c for downward pressing a side yoke 58, and the lowermost rolled steel plate 72 also has a pair of projections 72c for upward pressing the side yoke 58. The depth of each of the shallow grooves 54a and 56a is equal to the thickness of each of the uppermost rolled steel plate 70 and the lowermost rolled steel plate 72. The main yoke 50 according to this preferred embodiment is also subjected to anticorrosion treatment similar to that the first preferred embodiment, so as to improve the anticorrosion property.

In the magnetic circuit 28' according to the second preferred embodiment, an elastic sheet may be interposed between the upper groove 54a of the inner magnet 54 and the projection 70a of the uppermost rolled steel plate 70, and an elastic sheet may be interposed between the upper groove 56a of the outer magnet 56 and the projection 70b of the uppermost rolled steel plate 70. Similarly, an elastic sheet may be interposed between the lower groove 54a of the inner magnet 54 and the projection 72a of the lowermost rolled steel plate 72, and an elastic sheet may be interposed between the lower groove 56a of the outer magnet 56 and the projection 72b of the lowermost rolled steel plate 72. In this case, the inner magnet 54 and the outer magnet 56 can be more firmly fixed by caulking the projections 70a, 70b, 72a, and 72b with the elastic sheets interposed as mentioned above.

Figure 10:
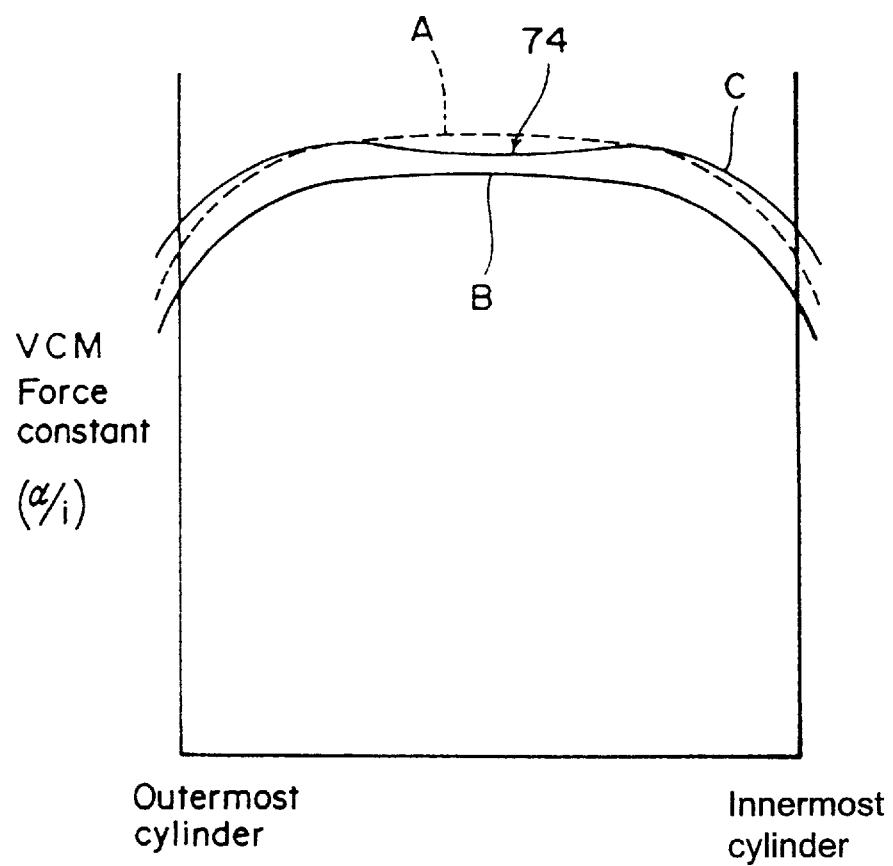
FIG. 10 is a graph showing a characteristic of each magnetic circuit mounted in the magnetic disk unit.

Referring to FIG. 10, there is shown a characteristic of each magnetic circuit mounted in the magnetic disk unit. In FIG. 10, a curve A corresponds to a conventional magnetic circuit having magnets bonded by adhesive; a curve B corresponds to the magnetic circuit according to the first preferred embodiment of the present invention; and a curve C corresponds to the magnetic circuit according to the second preferred embodiment of the present invention. Further, a represents an actuator acceleration, and i represents a coil current.

In the conventional magnetic circuit A, a force constant of the VCM is remarkably reduced on both sides. In the magnetic circuit B according to the first preferred embodiment of the present invention and the magnetic circuit C according to the second preferred embodiment of the present invention, a magnetic flux density at a magnetic flux concentrating portion of the yoke is relaxed to result in a slight increase in the force constant on both sides as compared with the conventional magnetic circuit A. In the curve C showing the characteristic of the second preferred embodiment, the magnetic flux density at a central portion 74 is large enough. Therefore, even if the height of the magnets is somewhat cut, an enough force constant can be ensured.

Figure 11:
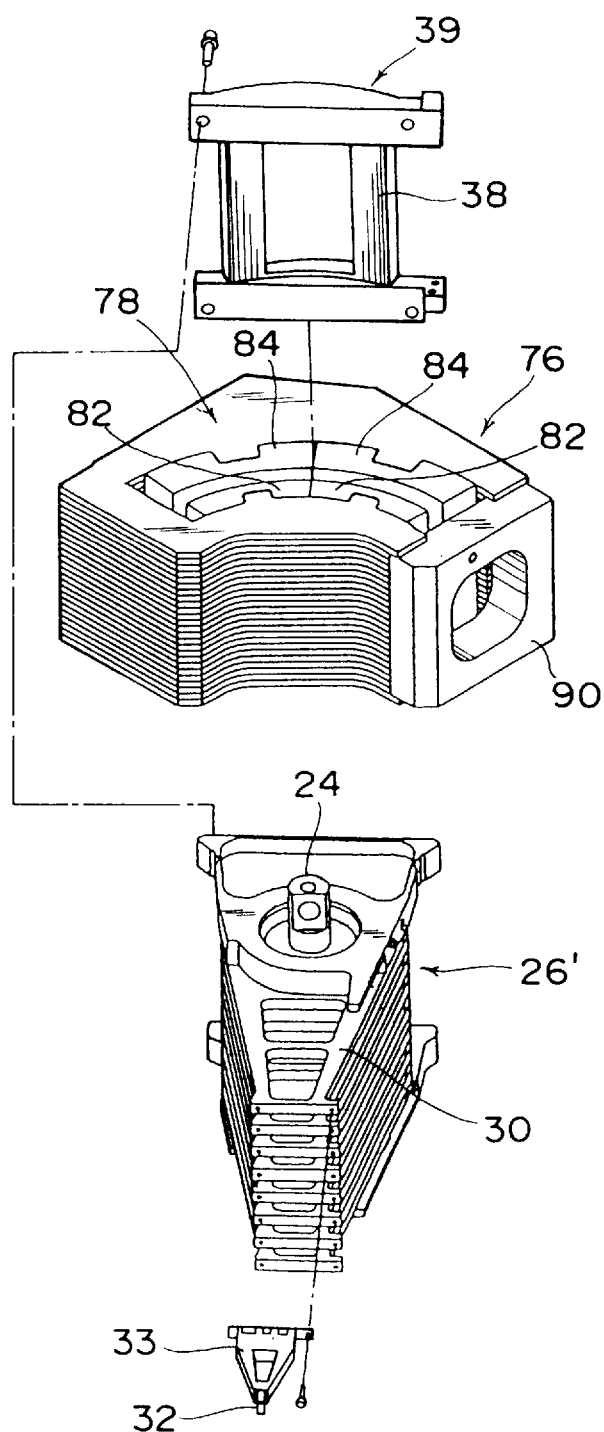
FIG. 11 is an exploded perspective view of an actuator assembly employing a U-shaped magnetic circuit.
Figure 12:
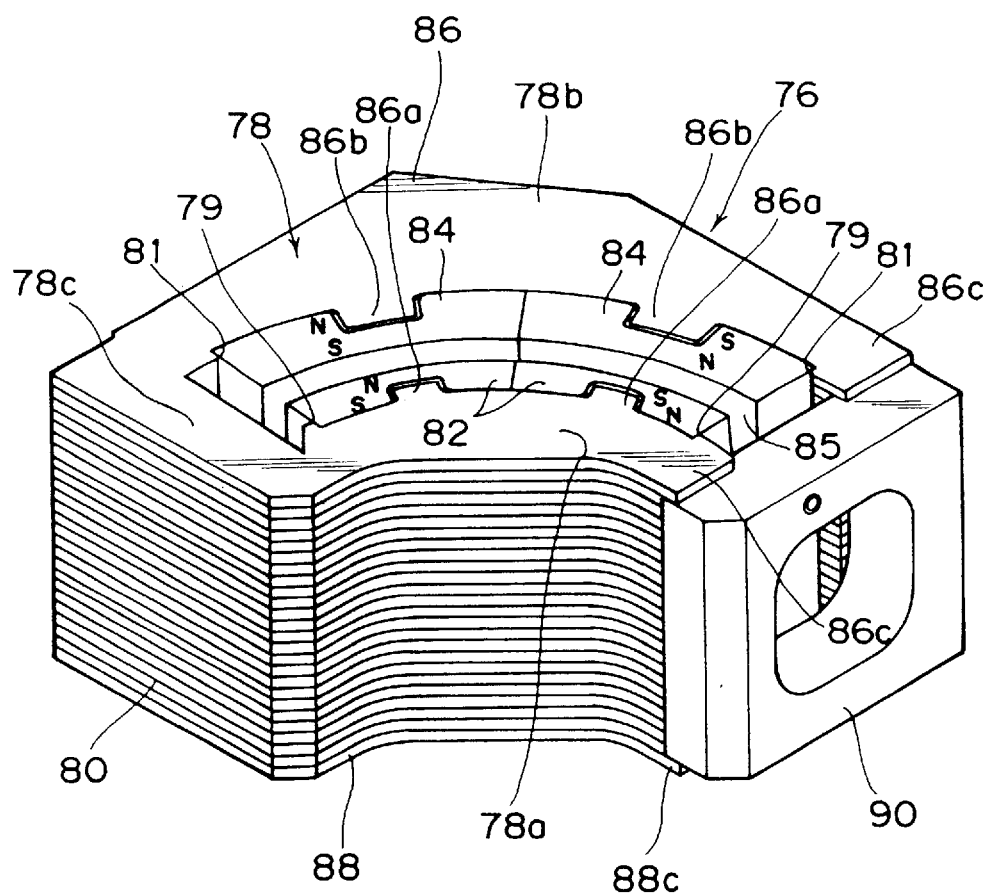
FIG. 12 is a perspective view of a magnetic circuit according to a third preferred embodiment.

Now, a magnetic circuit according to a third preferred embodiment of the present invention in case of employing a U-shaped yoke will be described with reference to FIGS. 11 and 12. Referring to FIG. 11, reference numeral 26' denotes an actuator assembly rotatably mounted on a shaft 24 and having a plurality of actuator arms 30. A spring arm 33 mounting a magnetic head 32 thereon is fixed to an end of each actuator arm 30. A coil assembly 39 having a coil 38 is fixed to the actuator assembly 26' on the side opposite to the actuator arms 30. Reference numeral 76 denotes the magnetic circuit according to the third preferred embodiment of the present invention. The magnetic circuit 76 is composed of a U-shaped main yoke 78, a pair of inner magnets 82, a pair of outer magnets 84, and a side yoke 90.

The magnetic circuit 76 will now be described in more detail with reference to FIG. 12. The main yoke 78 has an inner yoke 78a, an outer yoke 78b, and a connecting portion 78c integrally connecting the inner yoke 78a and the outer yoke 78b. The two inner magnets 82 are mounted on an outer circumferential surface of the inner yoke 78a, and the two outer magnets 84 are mounted on an inner circumferential surface of the outer yoke 78b.

The outer circumferential surface of the inner yoke 78a is formed with a pair of shoulders 79 against which circumferential opposite ends of the inner magnets 82 abut, thereby preventing circumferential slide of the inner magnets 82. The inner circumferential surface of the outer yoke 78b is formed with a pair of shoulders 81 against which circumferential opposite ends of the outer magnets 84 abut, thereby preventing circumferential slide of the outer magnets 84.

The main yoke 78 is manufactured by stacking a plurality of cold rolled steel plates 80 formed by pressing and then connecting them together by caulking. A gap 85 is defined between the inner magnets 82 and the outer magnets 84, and the coil 38 is inserted into the gap 85. An upper surface and a lower surface of each inner magnet 82 are formed with shallow grooves. Similarly, an upper surface and a lower surface of each outer magnet 84 are also formed with shallow grooves. An uppermost rolled steel plate 86 forming an uppermost layer of the main yoke 78 has a plurality of projections 86a and 86b respectively engaging with the shallow grooves formed on the upper surfaces of the inner magnets 82 and the shallow grooves formed on the upper surfaces of the outer magnets 84. Similarly, a lowermost rolled steel plate 88 forming a lowermost layer of the main yoke 78 has a plurality of projections engaging with the shallow grooves formed on the lower surfaces of the inner and outer magnets 82 and 84.

The uppermost rolled steel plate 86 further has a pair of projections 86c for downwardly pressing the side yoke 90, and the lowermost rolled steel plate 88 also has a pair of projections 88c for upwardly pressing the side yoke 90. The main yoke 78 according to this preferred embodiment is also subjected to anticorrosion treatment similar to that of the first and second preferred embodiments, so as to improve the anticorrosion property.

As mentioned above, the main yoke according to the present invention is manufactured by stacking a plurality of rolled steel plates and connecting them together by caulking. Accordingly, the main yoke having a complex shape can be manufactured simply at low costs. Furthermore, the inner magnet and the outer magnet are fixed at given positions in the main yoke without using adhesive. Accordingly, the adverse effect of the gas generating from the adhesive to the magnetic heads as in prior art disk unit can be prevented.

What is claimed is:

1. A voice coil motor having a magnetic circuit structure in a disk unit, comprising:

a yoke manufactured by stacking a plurality of flat steel plates along a first direction, said plurality of flat steel plates having an uppermost steel plate and a lowermost steel plate, a selected side edge of each of said flat steel plates forming a circumferential surface along a second direction orthogonal to the first direction; and a magnet mounted on the circumferential surface of said yoke, said magnet having two circumferential ends and having first and second surfaces, the first surface of said magnet facing the circumferential surface of said yoke, the second surface of said magnet being opposite to the first surface of said magnet and in parallel with the circumferential surface of said yoke, a magnetic flux emanating from the first surface of said magnet along a normal direction of the first surface of said magnet;

the circumferential surface of said yoke having a first pair of shoulders against which both said circumferential ends of said magnet abut;

said magnet having an upper surface and a lower surface, each of which is formed with a shallow groove at a substantially central portion of said magnet in the second direction;

the uppermost steel plate of said yoke having a first projection from the uppermost steel plate toward said magnet, the first projection of the uppermost steel plate seated in the shallow groove formed on the upper surface of said magnet; and the lowermost steel plate of said yoke having a second projection from the lowermost steel plate toward said magnet, the second projection of the lowermost steel plate seated in the shallow groove formed on the lower surface of said magnet, wherein said circumferential surface of said yoke and said first surface of said magnet are secured exclusively by magnetic attraction, without any adhesive between said circumferential surface and said first surface.

2. A magnetic circuit structure according to the claim 1, wherein each of said steel plates has a first surface formed with a third projection and a second surface formed with a recess having a shape corresponding to that of the third projection, the third projection and the recess of adjacent ones of said steel plates being engaged with each other to connect said plurality of steel plates.

3. A magnetic circuit structure in a disk unit according to claim 2, further comprising:

at least one magnet fixing plate fixed to said yoke so as to project an end portion of said magnet fixing plate, for preventing vertical slip of said magnet.

4. A magnetic circuit structure in a disk unit according to claim 3, wherein said magnet fixing plate comprises a pair of plates respectively fixed to an upper surface and a lower surface of said yoke and respectively abutting against an upper surface and a lower surface of said magnet.

5. A magnetic circuit structure in a disk unit according to claim 4, wherein one of said pair of plates abutting against said upper and lower surfaces of said magnet has a magnet pressing portion.

6. A magnetic circuit structure in a disk unit according to claim 2, wherein said uppermost plate further has a pair of projections for fixing a side yoke, and said lowermost plate further has a pair of projections for fixing said side yoke.

7. A magnetic circuit structure in a disk unit according to claim 6, wherein said first and second projections of said uppermost and lowermost plates, respectively, are fixed by caulking within said shallow grooves of said upper and lower surfaces of said magnet, respectively.

8. A magnetic circuit structure in a disk unit according to claim 2, wherein said yoke has a metal coating.

9. A magnetic circuit structure in a disk unit according to claim 2, wherein said yoke has a resin coating.

10. A voice coil motor having a magnetic circuit structure in a disk unit, comprising:

a yoke formed of a plurality of steel plates stacked along a first direction, said plurality of steel plates having a lowermost steel plate and an uppermost steel plate a side edge of each of said plurality of plates forming a circumferential surface along a second direction orthogonal to the first direction;

a magnet mounted on said circumferential surface of said yoke, said magnet having two circumferential ends and having upper and lower surfaces, said upper and lower surfaces of said magnet being formed in the second direction at a substantially central portion of said magnet with first and second shallow grooves, respectively;

said uppermost steel plate of said plurality of steel plates having a first projection seated in said first shallow groove formed on said upper surface of said inner magnet;

said lowermost steel plate of said plurality of steel plates having a second projection seated in said second shallow groove formed on said lower surface of said magnet;

a side yoke attached to said yoke by magnetic forces of said magnet;

said circumferential surface of said yoke having a first pair of shoulders against which both circumferential ends of said magnet abut, whereby said first pair of shoulders prevent said magnet from moving in a circumferential direction with respect to said yoke, wherein said circumferential surface of said yoke and said first surface of said magnet are secured exclusively by magnetic attraction, without any adhesive between said circumferential surface and said first surface.

11. A magnetic circuit structure in a disk unit according to claim 10, wherein each of said steel plates has a first surface formed with a projection and a second surface formed with a recess having a shape corresponding to that of said projection, said projection and said recess of adjacent ones of said steel plates being engaged with each other to connect said plurality of steel plates.

12. A magnetic circuit structure in a disk unit according to claim 11, wherein said yoke has a metal coating.

13. A magnetic circuit structure in a disk unit according to claim 11, wherein said yoke has a resin coating.

14. A magnetic circuit structure in a disk unit according to claim 10, wherein said uppermost steel plate further has a pair of projections for fixing a side yoke, and said lowermost steel plate further has a pair of projections for fixing said side yoke.

15. A magnetic disk unit comprising:

a housing having a base and a cover;

a magnetic disk rotatably mounted in said housing, said magnetic disk having a plurality of tracks;

a magnetic head for writing and reading data to and from said magnetic disk;

an actuator arm assembly rotatably mounted on said base, said actuator arm assembly having one end to which said magnetic head is mounted and another end to which a coil is mounted; and a voice coil motor including said coil and a magnetic circuit fixed to said base, said coil being operatively inserted in said magnetic circuit;

said magnetic circuit including a yoke formed of a plurality of steel plates;

a magnet mounted on a circumferential surface of said yoke and having two circumferential ends, said magnet further having upper and lower surfaces, and being formed with first and second shallow grooves, respectively, at a substantially center portion of said upper and lower surfaces, said circumferential surface of said yoke having a first pair of shoulders against which both circumferential ends of said magnet abut, whereby said first pair of shoulders prevent said magnet from moving in a circumferential direction with respect to said yoke;

a first projection on an uppermost steel plate of said plurality of steel plates, projecting from said yoke and seated in said first shallow groove formed on said upper surface of said magnet;

a second projection on a lowermost steel plate of said plurality of steel plates, projecting from said yoke and seated in said second shallow groove formed on said lower surface of said inner magnet; and a side yoke attached to a side of said yoke by magnetic forces of said magnet wherein said circumferential surface of said yoke and said first surface of said magnet are secured exclusively by magnetic attraction, without any adhesive between said circumferential surface and said first surface.

16. A magnetic disk unit according to claim 15, wherein each of said rolled steel plates has a first surface formed with a projection and a second surface formed with a recess having a shape corresponding to that of said projection, said projection and said recess of adjacent ones of said steel plates being engaged with each other to connect said plurality of steel plates.

17. A magnetic disk unit according to claim 16, further comprising:

at least one magnet fixing plate fixed to said yoke so as to project an end portion of said magnet fixing plate, for preventing vertical slip of said magnet.

18. A magnetic disk unit according to claim 17, wherein said magnet fixing plate comprises a pair of plates respectively fixed to an upper surface and a lower surface of said yoke and respectively abutting against an upper surface and a lower surface of said magnet.

19. A magnetic disk unit according to claim 18, wherein one of said pair of plates abutting against said upper and lower surfaces of said magnet has a magnet pressing portion.

20. A magnetic disk unit according to claim 15, wherein said uppermost plate further has a pair of projections for fixing said side yoke to said yoke, and said lowermost plate further has a pair of projections for fixing said side yoke to said yoke.

21. A magnetic disk unit according to claim 20, wherein said first and second projections are fixed by caulking within said first and second shallow grooves.

22. A magnetic disk unit according to claim 21, further comprising a first elastic sheet interposed between said first shallow groove formed on said upper surface of said magnet and said first projection.

* * * * *

UNITED STATES PATENT AND TRADEMARK OFFICE
CERTIFICATE OF CORRECTION

PATENT NO. : 5,847,903
DATED : December 8, 1998
INVENTOR(S) : Ogawa et al.

It is certified that error appears in the above-identified patent and that said Letters Patent is hereby corrected as shown below:

<u>On the Title Page</u>

Under "[56] References Cited", delete "4,872,411 10/1989 Schalk" and insert --4,782,411 11/1988 Schalk-- therefor Column 1, line 47, after "magnetic" insert --force-- therefor Column 1, line 50, delete "causing a shape" and insert --causing the shape-- therefor Column 3, line 15, delete "and in the direction indicated generally"

UNITED STATES PATENT AND TRADEMARK OFFICE
CERTIFICATE OF CORRECTION

PATENT NO. : 5,847,903
DATED : December 8, 1998
INVENTOR(S) : Ogawa et al.

It is certified that error appears in the above-identified patent and that said Letters Patent is hereby corrected as shown below:

Column 3, line 19, after "Fig. 4" insert --and in the direction indicated generally--

Column 3, line 24, delete "and in the direction indicated generally"

Column 3, line 28, after "Fig. 8" insert -- and in the direction indicated generally-- therefor Column 5, line 6, delete "resin penetrate" insert --resin to penetrate-- therefor Column 5, line 56, delete "the vertically" and insert --vertically-- therefor

UNITED STATES PATENT AND TRADEMARK OFFICE
CERTIFICATE OF CORRECTION

PATENT NO. : 5,847,903
DATED : December 8, 1998
INVENTOR(S) : Ogawa et al.

It is certified that error appears in the above-identified patent and that said Letters Patent is hereby corrected as shown below:

Column 6, line 4, delete "that the first" and insert

--that of the first-- therefor

Column 6, line 31, delete "a represents" and insert -

--α represents-- therefor

Signed and Sealed this

Twenty-third Day of November, 1999

Attest:

Q. TODD DICKINSON

*Attesting Officer*  *Acting Commissioner of Patents and Trademarks*